(12) United States Patent
Le Gall et al.

(10) Patent No.: US 7,477,041 B2
(45) Date of Patent: Jan. 13, 2009

(54) BATTERY CHARGING METHOD

(75) Inventors: Murielle Le Gall, Le Chesnay (FR);
Daniel Benchetrite, Asnieres-sur-Seine (FR); Olivier Bach, Jourques (FR)

(73) Assignee: Commissariat a l'Energie Atomique, Paris (FR)

( * ) Notice: Subject to any disclaimer, the term of this patent is extended or adjusted under 35 U.S.C. 154(b) by 275 days.

(21) Appl. No.: 11/579,107

(22) PCT Filed: May 3, 2005

(86) PCT No.: PCT/FR2005/001124

§ 371 (c)(1),
(2), (4) Date: Oct. 31, 2006

(87) PCT Pub. No.: WO2005/122319

PCT Pub. Date: Dec. 22, 2005

(65) Prior Publication Data

US 2008/0048623 A1 Feb. 28, 2008

(30) Foreign Application Priority Data

May 13, 2004 (FR) .................................. 04 05200

(51) Int. Cl.
*H02J 7/04* (2006.01)
*H02J 7/16* (2006.01)
(52) U.S. Cl. ........................ 320/145; 320/141; 320/143; 320/156; 320/157; 320/161; 320/162
(58) Field of Classification Search ................. 320/141, 320/143, 145, 156, 157, 161, 162
See application file for complete search history.

(56) References Cited

U.S. PATENT DOCUMENTS 5,412,306 A 5/1995 Meadows et al.

(Continued)

FOREIGN PATENT DOCUMENTS

| EP | 0 330 981 | A2 | 9/1989 |
| EP | 1 341 286 | A2 | 9/2003 |
| FR | 2 239 772 | | 2/1975 |
| JP | A 10-302845 | | 11/1998 |

OTHER PUBLICATIONS

F. Diaz et al., "A Comparative Study of Pulsed Current Formation for Positive Plates of Automotive Lead Acid Batteries," Journal of Power Sources vol. 109 (2002), pp. 184-188.

*Primary Examiner*—Akm E Ullah
*Assistant Examiner*—Johali A Torres Ruiz
(74) *Attorney, Agent, or Firm*—Oliff & Berridge, PLC

(57) ABSTRACT

The battery charging method uses a pulsed current alternately taking first and second amplitudes during first and second periods (t1, t2). At least one of the parameters, amplitude and duration, of the current during the first period (t1) is automatically servo-controlled as a function of a first value of the slope (P1) of the voltage (U), measured at the terminals of the battery to be charged. The first slope value (P1) is calculated at least at the end of the first period (t1). Likewise, a second value of the slope (P2) of the voltage (U) can be calculated at least at the end of the second period (t2) and at least one of the parameters of the current during the second period (t2) can be automatically servo-controlled as a function of the second slope value (P2). The different parameters of the pulsed charging current are thus continuously servo-controlled as a function of the voltage slope to keep the slope (P) within a range comprised between 1 mV/s and 6 mV/s.

8 Claims, 13 Drawing Sheets

U.S. PATENT DOCUMENTS

| | | |
|---|---|---|
| 5,710,506 A | 1/1998 | Broell et al. |
| 6,043,631 A * | 3/2000 | Tsenter ........................ 320/148 |
| 6,097,172 A * | 8/2000 | Podrazhansky et al. ..... 320/107 |
| 6,154,011 A | 11/2000 | Lam et al. |
| 6,954,051 B2 * | 10/2005 | Trinh et al. ................. 320/145 |

* cited by examiner

US 7,477,041 B2

BATTERY CHARGING METHOD

BACKGROUND OF THE INVENTION

The invention relates to a method for charging a battery by rectangular current pulses alternately taking a first amplitude during a first period and a second amplitude, different from the first one, during a second period. This method comprises determination of a first slope value representative of the variation of the voltage at the terminals of the battery versus time, from successive measurements of said voltage during each first period.

STATE OF THE ART

Charging or recharging a battery is conventionally performed under the control of a charge regulator. The different ways of managing a battery charge currently used are based either on measurement of the voltage at the battery terminals or on measurement of the battery charging current.

A first known management mode is of the connection/disconnection (On/Off) type, based on interrupting charging when the voltage reaches a high threshold and resuming charging when the voltage reaches a reconnection voltage threshold. In this management mode, which is easy to implement, the voltage thresholds are often badly adjusted and it is difficult to fully charge the battery.

Another known management mode consists in keeping the battery voltage constant, which enables the current value to be reduced when the required voltage is reached, possibly using pulse width modulation (PWM) of the charging current. However, a large power dissipation is required and the voltage thresholds are often badly adjusted.

The above two management modes, based on voltage measurement, are not optimized to take account of the different battery technologies and the different applications for which the batteries are to be used.

A management mode based on current measurement uses counting of the ampere-hours input to and output from the battery. This management mode is fairly rarely used as it is imprecise in time and does not take account of degassing correctly, in particular in the case of open lead-acid batteries with a liquid electrolyte.

Another management mode, developed in particular for batteries equipping electric vehicles, uses a pulsed charging current. This in particular enables the recharging time of the battery to be reduced, but the current parameters are often badly adjusted.

U.S. Pat. No. 6,154,011 proposes to modify the mean charging current of the battery according to the mean overvoltage so as to maintain an acceptable hydrolysis level. The mean current charging means can be adapted by reducing the amplitude of the current pulses, by increasing the interval between two current pulses (OFF-time) and/or by reducing the duration (ON-time) of the charging current pulses.

U.S. Pat. No. 5,412,306 proposes to reduce the amplitude of a current pulse by a predetermined factor, for example to divide it by 2, so as to constitute a stepped-down pulse when the voltage slope versus time reaches zero after it has reached a certain value (for example 2.5 V/s). End of charging of the battery is thus not performed by pulsed current, but by a succession of stepped-down pulses each having decreasing amplitude steps.

Document EP-A-1341286 describes a battery charging method comprising a boost charge phase, an equalization charge phase and a maintenance charge phase. The boost charge phase is completed when the voltage presents two inflection points of opposite signs. During the equalization and maintenance charge phases, the charging current can be a pulsed current.

In the battery charging method according to U.S. Pat. No. 5,710,506, charging is completed when the voltage at the battery terminals or the voltage gradient exceeds a threshold value. During a maintenance phase, the current can be zero until the voltage drops back below a voltage threshold and take a predetermined maximum value until the voltage or the voltage gradient reaches a predetermined threshold.

The different known pulsed current charging methods are not optimized for the different types of batteries marketed.

OBJECT OF THE INVENTION

The object of the invention is to overcome the drawbacks of known charging methods and, more particularly, to enable the set of pulsed current charging parameters of any type of battery and for any type of application to be determined.

According to the invention, this object is achieved by a charging method according to the appended claims and, more particularly by the fact that, the first amplitude and the duration of the first period being previously determined, the method comprises servo-control of at least one of the current parameters during the subsequent first periods as a function of said first slope value, calculated and compared with a first predetermined range at the end of each first period, the first current amplitude and/or the duration of the first period being modified if the first slope value goes outside the first range.

BRIEF DESCRIPTION OF THE DRAWINGS

Other advantages and features will become more clearly apparent from the following description of particular embodiments of the invention given as non-restrictive examples only and represented in the accompanying drawings, in which.

DESCRIPTION OF PARTICULAR EMBODIMENTS

Figure 1:
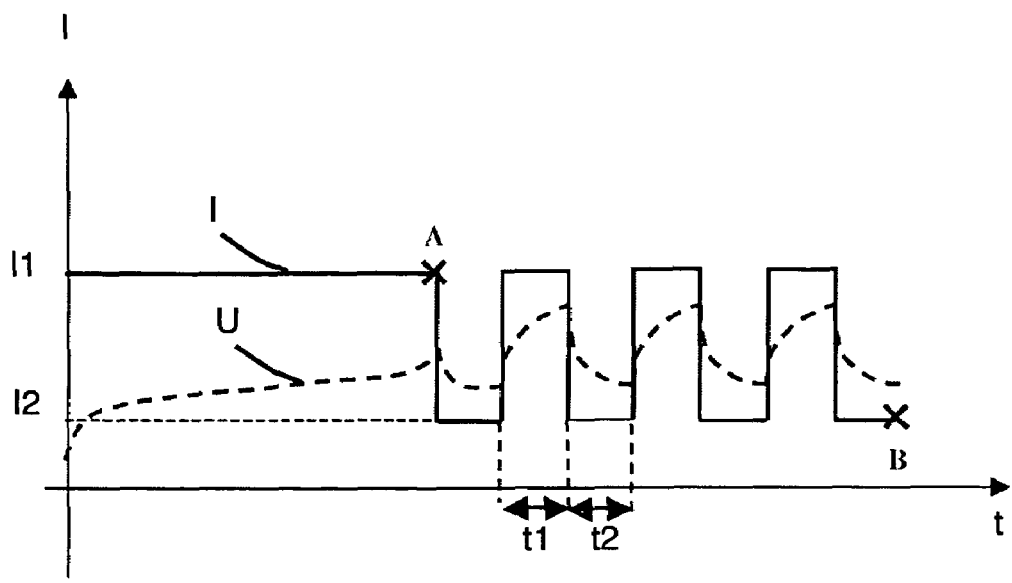
FIG. 1 schematically illustrates the variations, versus time, of the charging current I of a battery charged by the method according to the invention, and the corresponding variations of the voltage U.

In FIG. 1, the charging current I of the battery is a pulsed current between times A and B, after application of a current of constant amplitude up to the time A. To enhance the number of germination sites with respect to crystal growth inside the battery, it is however preferable that the pulsed current be applied to the battery from the very beginning of charging or recharging.

The pulsed current is conventionally constituted by rectangular current pulses alternately taking a first amplitude I1, during a first period t1, and a second amplitude I2, lower than the first one, during a second period t2.

Figure 2:
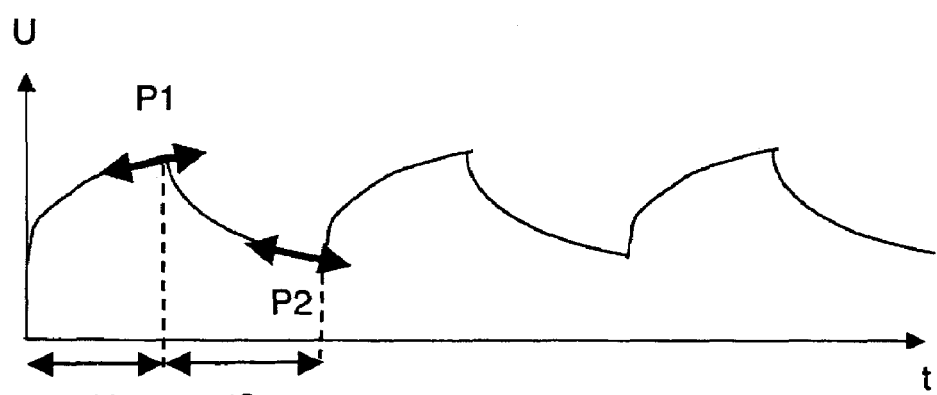
FIG. 2 illustrates the variations, versus time, of the voltage U at the terminals of the battery charged by the method according to the invention.

As illustrated in FIG. 2, a first value of the slope P1 of the voltage U, measured at the terminals of the battery to be charged, is calculated at least at the end of the first period t1. At least one of the current parameters (I1, t1) during the first period is automatically servo-controlled as a function of the first calculated slope value P1. In the same way, a second value of the slope P2 of the voltage U, measured at the terminals of the battery to be charged, is calculated at least at the end of the second period t2. At least one of the current parameters (I2, t2) during the second period is automatically servo-controlled as a function of the second calculated slope value P2.

The different parameters of the pulsed charge current are thus continuously servo-controlled as a function of the slope P of the voltage U measured at the battery terminals. In FIG. 2, the absolute values of the first and second slope values P1 and P2, representative of the variation of the voltage U versus time, respectively at the end of the first and second periods (t1, t2), are comprised between 1 mV/s and 6 mV/s. The evolution of the voltage U over time thus obtained is then optimal.

Figure 3:
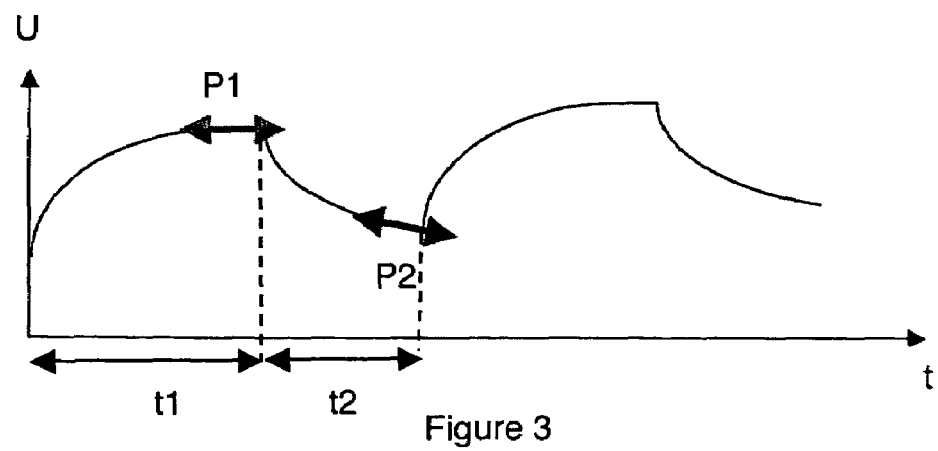
FIGS. 3 to 6 illustrate the variations, versus time, of the voltage U at the terminals of a battery, respectively when the duration of a first period t1 is not suitable (FIGS. 3 and 4) or when the duration of a second period t2 is not suitable (FIGS. 5 and 6).
Figure 4:
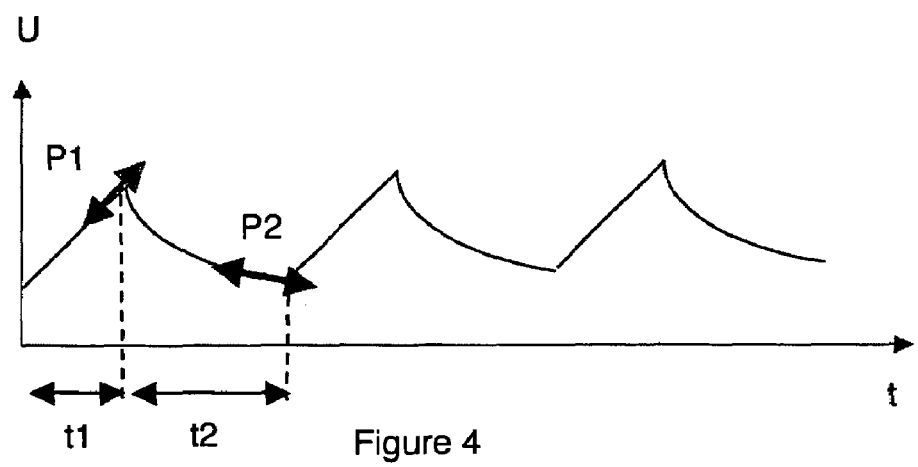
Figure 5:
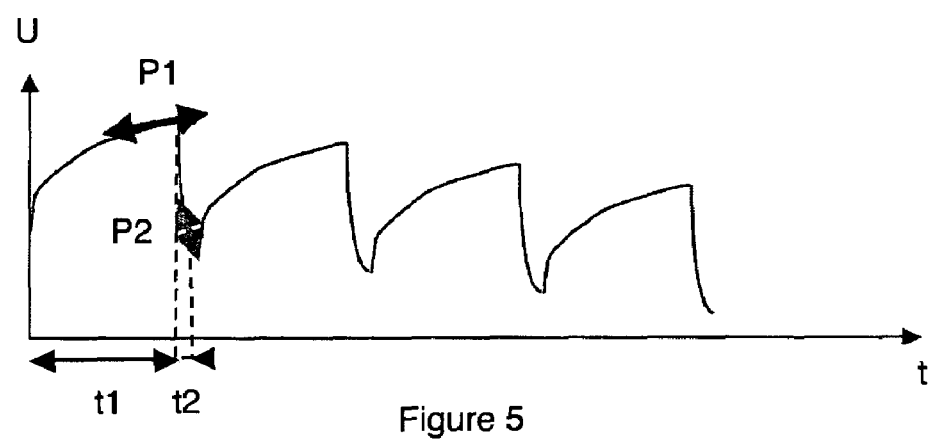
Figure 6:
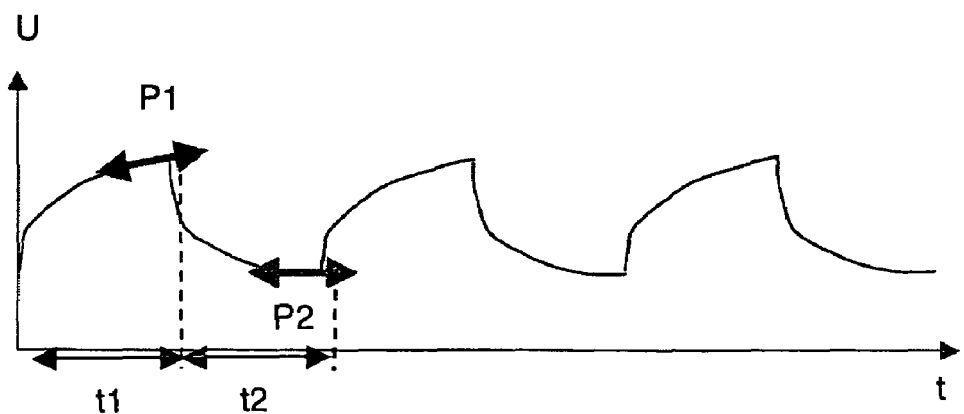

On the other hand in the absence of servo-control according to the invention, as in FIGS. 3 and 4, the duration of the first period t1 is unsuitable, respectively too long and too short, and the first slope value P1, at the end of the first period, is respectively less than 1 mV/s and more than 6 mV/s. Likewise, in FIGS. 5 and 6, the duration of the second period t2 is unsuitable, respectively too short and too long, and the absolute value of the second slope value P2, at the end of the second period, is respectively more than 6 mV/s and less than 1 mV/s.

Charging the battery with a pulsed current which is servo-controlled as a function of the voltage slope, according to the invention, enables the charge to be optimized according to the type of battery and the field of application of this battery. Charging is then performed in a minimum time, while regulating the hydrolysis efficiently for aqueous liquid electrolyte batteries and increasing the capacity and lifetime of the battery.

FIGS. 7 to 10 illustrate an example of flowcharts of a first embodiment of a method according to the invention, which can be implemented by any known type of charge regulator.

Figure 7:
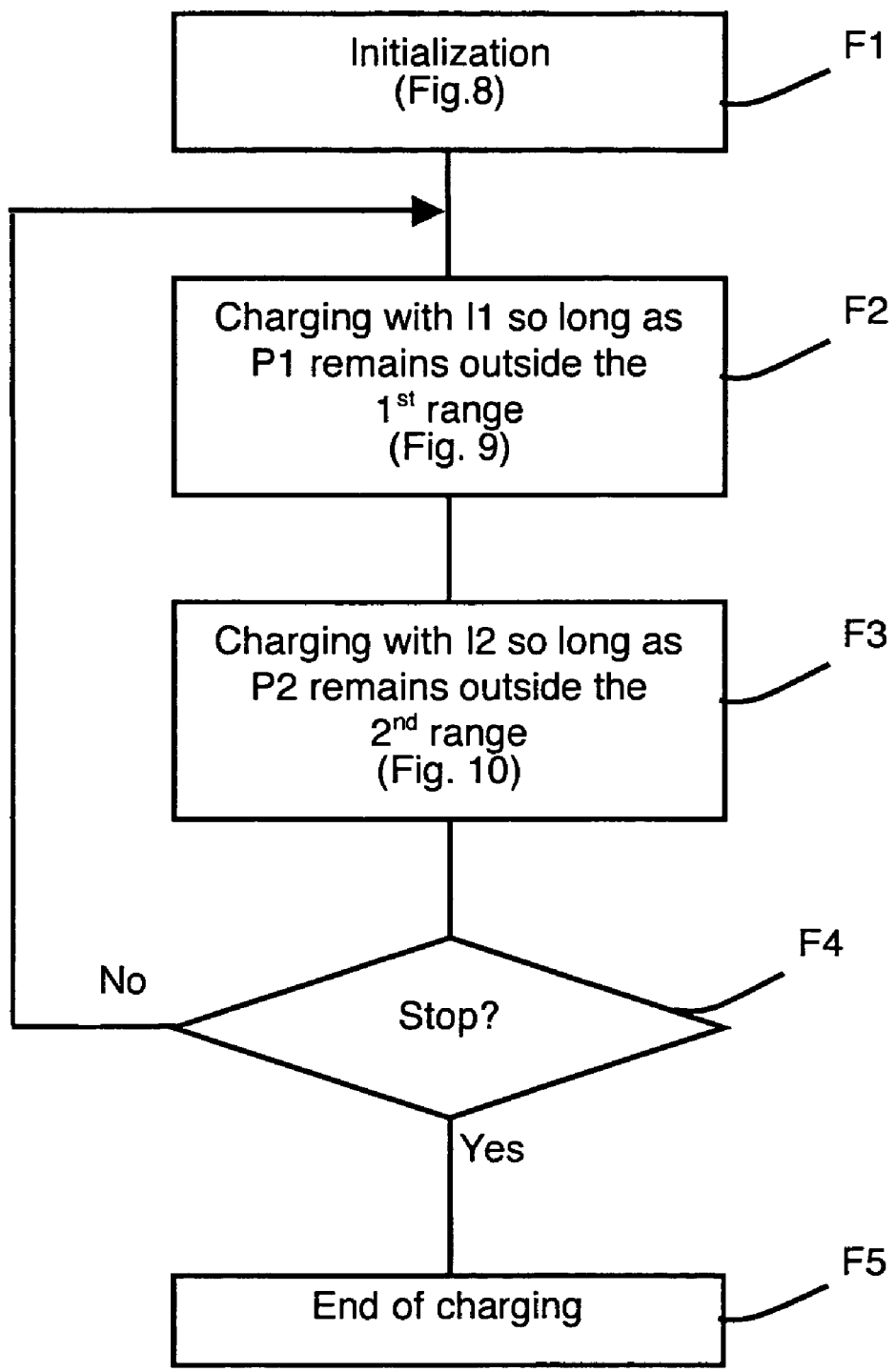
FIGS. 7 to 10 represent flowcharts of a first embodiment of the method according to the invention.
Figure 8:
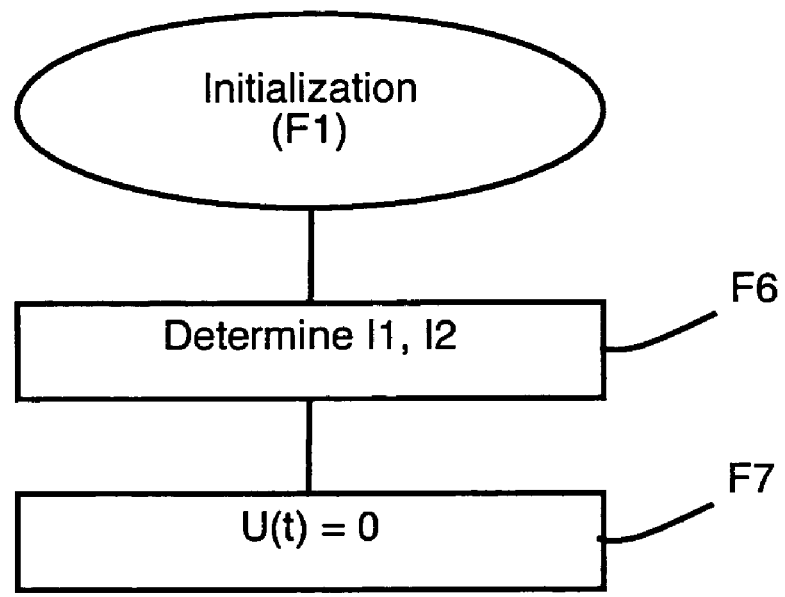

As illustrated in FIG. 7, in a first step F1, illustrated in greater detail in FIG. 8, the charging parameters are initialized according to the technical characteristics of the battery to be charged and the field of application for which this battery is intended, which determine its operating conditions. For example, a valve regulated lead-acid battery (VRLA), used in a photovoltaic installation, will be charged by a pulsed current having first and second values I1 and I2 depending directly on the energy produced by the photovoltaic panels. The voltage U at its terminals will have to be limited so as not to exceed a threshold, on average about 2.4V to 2.45V per electrochemical cell, so as to limit the damage liable to be caused by a large hydrolysis. In a preferred embodiment, the amplitude I2 can be zero.

In FIG. 7, after the initialization step F1, the charge regulator goes on to a step F2 of charging the battery with a current having a first amplitude I1 so long as the first slope value P1 remains outside a first range, preferably comprised between 1 mV/s and 6 mV/s. Charging of the battery by the current pulse of amplitude I1 is interrupted when the slope P1 of the voltage U at the terminals of the battery enters the corresponding range. The duration of the first period t1 is thus servo-controlled as a function of the first slope value P1.

When the first period is interrupted by the first slope value P1 entering the corresponding range, the regulator controls, in a step F3, charging of the battery with a current having a second amplitude I2, lower than the first amplitude I1, so long as the second slope value P2 remains outside a second range, preferably identical to the first one, i.e. comprised, in absolute value, between 1 mV/s and 6 mV/s. Charging of the battery by the current pulse of amplitude I2 is then interrupted when the slope P2 enters the corresponding range, thus servo-controlling the duration of the second period t2 as a function of the second slope value P2.

After step F3, the regulator checks, in a step F4 (Stop?), whether the battery is sufficiently charged, i.e. whether the charge should be interrupted or not. The decision criterion corresponding to stopping charging can be constituted by any criterion conventionally used when charging a battery. If this criterion is met (Yes output of F4), the regulator goes on to an end of charging step F5. If not (No output of F4), it loops back to the input of step F2 and continues charging the battery by pulses alternately taking the first and second amplitude I1 and I2, during first and second periods t1 and t2, respectively servo-controlled as a function of the first and second slope values P1 and P2.

Figure 9:
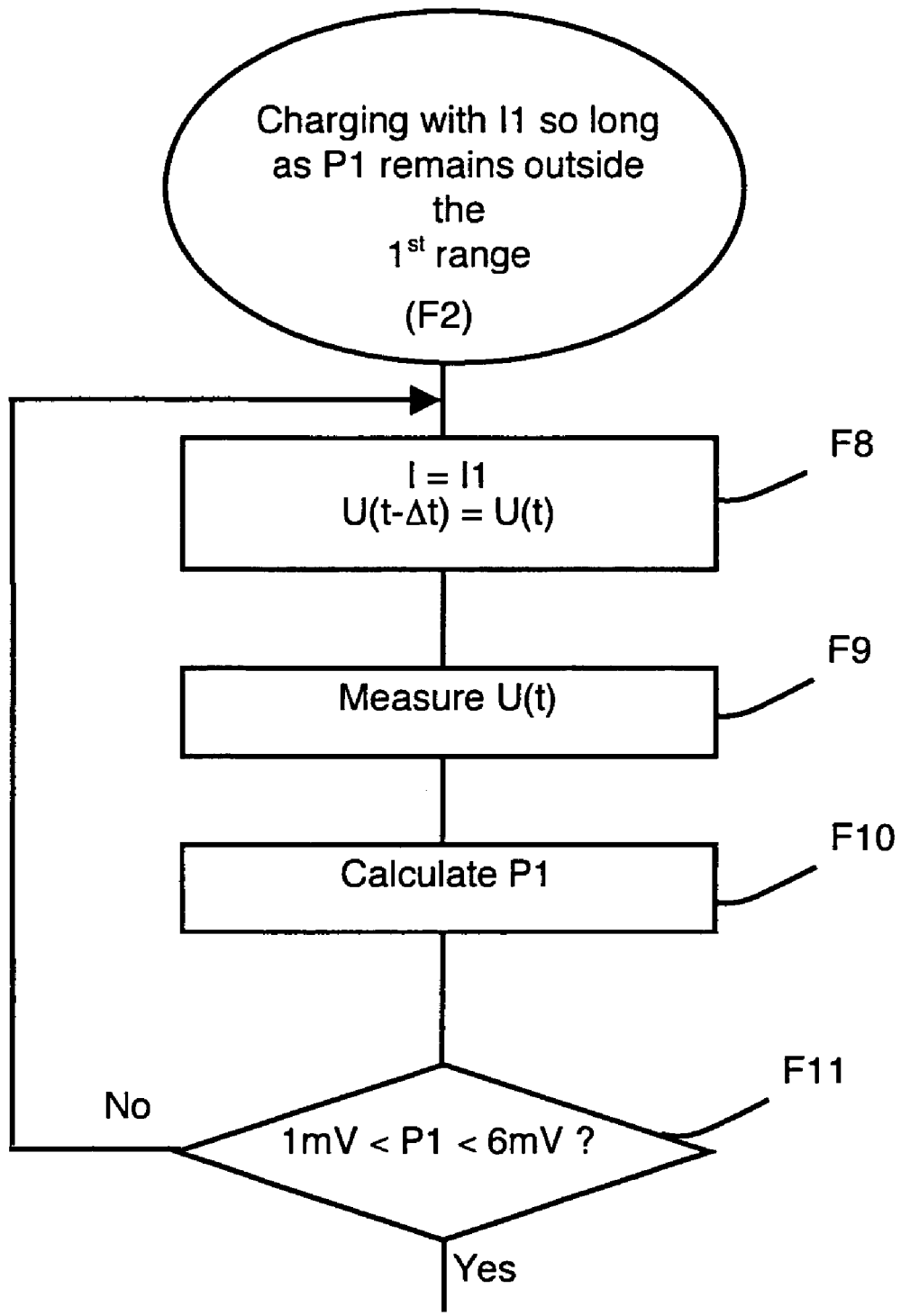
Figure 10:
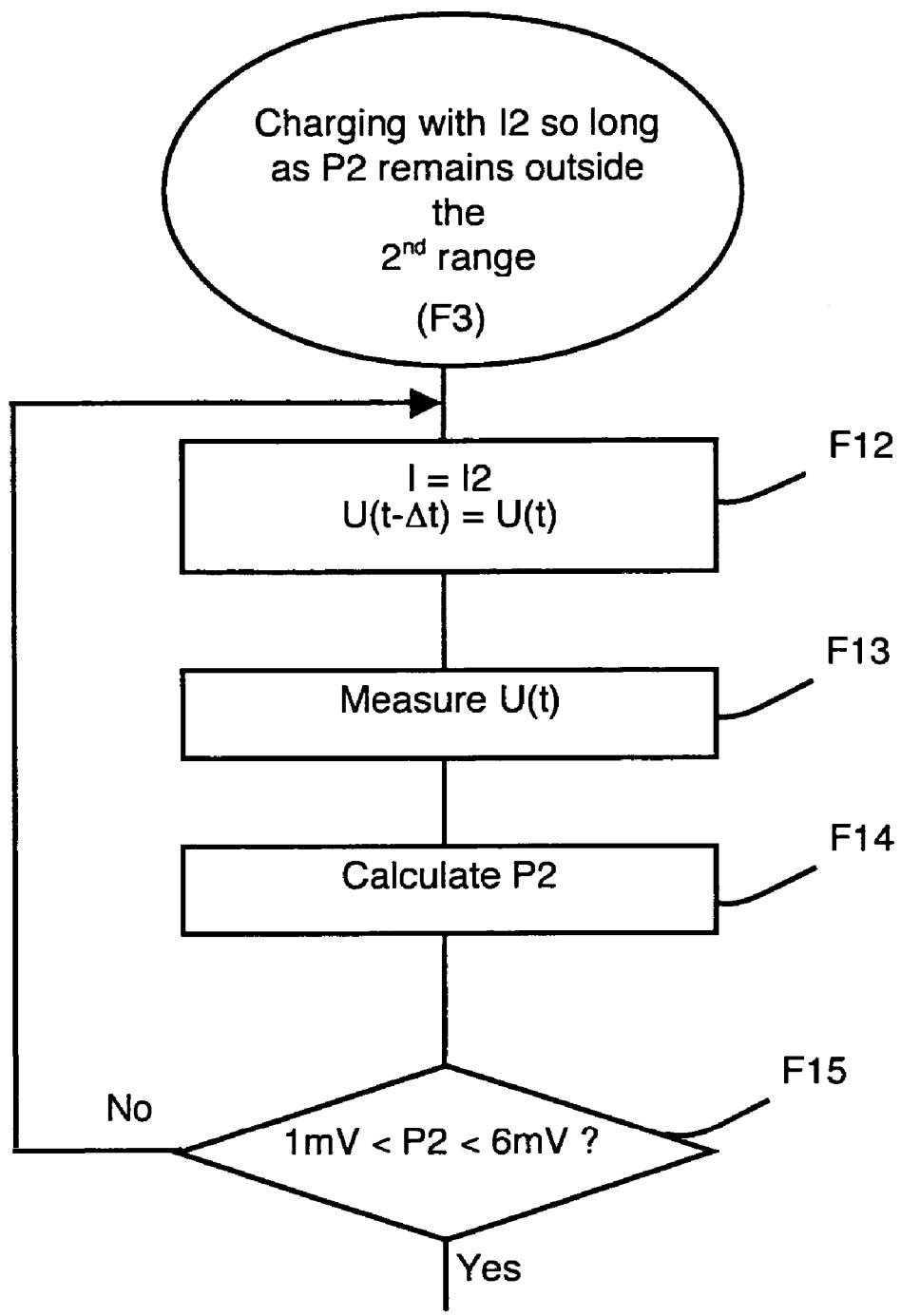

Embodiments of steps F1 to F3 are illustrated in greater detail respectively in FIGS. 8 to 10.

As represented in FIG. 8, the initialization step F1 first comprises, in a step F6, determination of the first and second amplitudes I1 and I2 of the charging current depending on the type of battery to be charged and the application for which this battery is intended. In the embodiment according to FIGS. 7 to 10, the amplitudes I1 and I2 remain unchanged throughout charging, the parameters which are servo-controlled as a function of the slope P of the voltage U being the first and second periods t1 and t2. Step F6 is followed by a step F7 in which the value of the voltage U(t) is initially set to zero.

Step F2 can then start, as represented in FIG. 9, with a step F8 in which the regulator sets the amplitude I of the charging current (I=I1) to the value I1 (previously determined during the step F6) and stores the previously recorded value of the voltage: $U(t-\Delta t)=U(t)$. Then, in a step F9, a new measurement of the voltage U(t) is recorded before the first slope value P1 is calculated in a step F10. The calculated first slope value P1 is then compared with a first range in a step F11. In FIG. 9, for example, the regulator checks whether the first slope value P1 is comprised between 1 mV/s and 6 mV/s. If this is not the case (No output of F11), the regulator loops back to the step F8. It therefore continues to apply the current of amplitude I1, unchanged, to the battery and stores the previously measured voltage value before calculating a new value of P1. The succession of steps F8 to F11 are repeated so long as the first slope value P1 remains outside the first range and, throughout this first period, the successive measurements of the voltage U(t) are made at predetermined time intervals Δt. These time intervals Δt preferably have a much shorter duration than the first period t1. The first slope value can then be calculated by taking the absolute value of the ratio between the difference between two successive values of the measured voltage and of the time Δt elapsed between these two measurements:

$$P1=|(U(t)-U(t-\Delta t))/\Delta t|.$$

When, in step F11, the regulator ascertains that the first slope value P1 has entered the first range (Yes output of F11), step F2 is stopped and the regulator then goes on to step F3. As represented in FIG. 10, step F3 can, in the same way as step F2, begin by a step F12 in which the amplitude of the charging current I is set to the value I2 (previously determined during step F6), the previously recorded value of the voltage being stored. Then a new value of the voltage U(t) is measured and stored in a step F13, similar to step F9, to then enable the second slope value P2=|(U(t)−U(t−Δt))/Δt| to be calculated, in a step F14, similar to step F10, and to be compared with the second range in a step F15, similar to step F11.

FIGS. 11 to 14 illustrate an example of flowcharts of a second embodiment of a method according to the invention.

Figure 12:
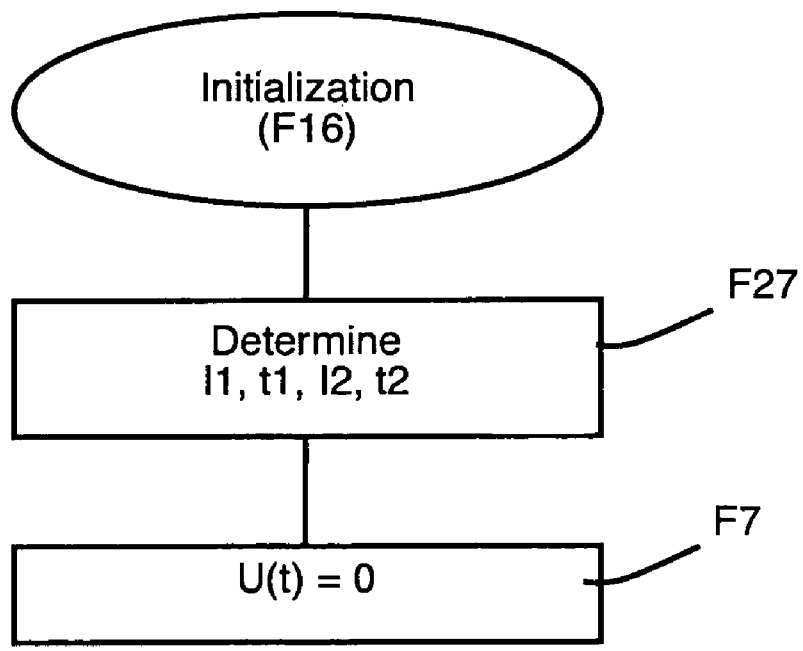
FIGS. 11 to 14 represent flowcharts of a second embodiment of the method according to the invention.
Figure 11:
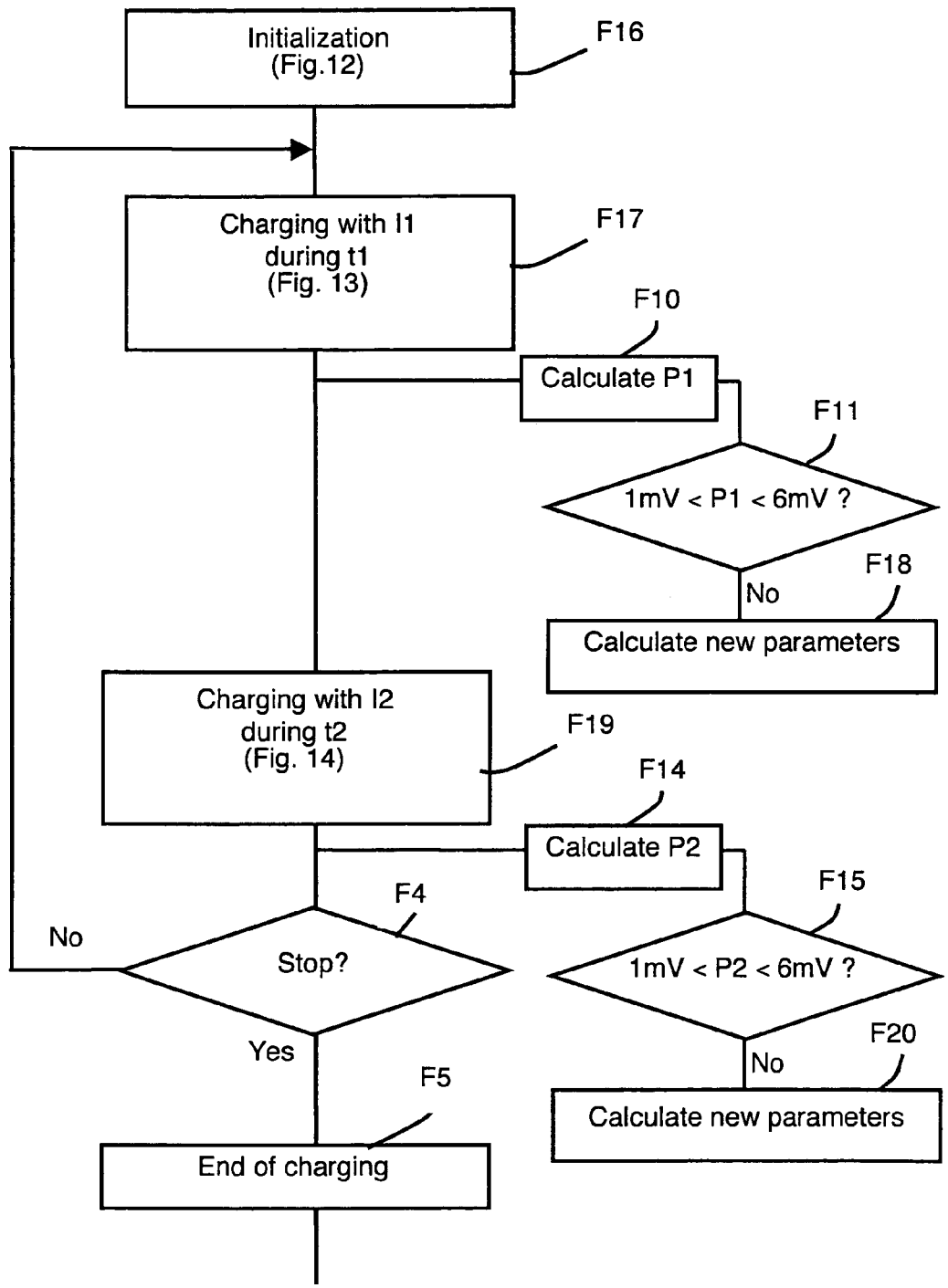

As illustrated in FIG. 11, in a step F16, illustrated in greater detail in FIG. 12, the charging parameters are first of all initialized according to the technical characteristics of the battery to be charged and the field of application for which this battery is intended. In the particular embodiment illustrated in FIG. 12, initial values of the parameters I1, I2, t1 and t2 are determined in the course of a step F27, followed by a step F7 in which the value of the voltage U(t) is initially set to zero.

In FIG. 11, after the initialization step F16, the charge regulator goes on to a step F17 of charging the battery with a current having a first amplitude I1 during a first period t1. Then, the regulator goes on to a step F19 of charging the battery with a current having a second amplitude I2 during a second period t2. At the same time, at the end of step F17, the regulator calculates the first slope value P1, in a step F10, and then compares the calculated first slope value with the first range in a step F11. If the first slope value P1 is outside the first range (No output of F11), the regulator modifies certain parameters in a step F18.

In like manner, at the end of step F19, the regulator calculates the second slope value P2, in a step F14, and then compares the calculated second slope value with the second range in a step F15. If the second slope value P2 is outside the second range (No output of F15), the regulator modifies certain parameters in a step F20. At the same time, at the output of step F19, as at the output of step F3 of FIG. 7, the regulator checks, in a step F4 (Stop?) whether the battery is sufficiently charged. If this is the case (Yes output of F4), the regulator goes on to an end of charging step F5. If not (No output of F4), it loops back to the input of step F17 and continues charging the battery by pulses alternately taking the first and second amplitude I1 and I2, which may have been modified in F18 or F20, during first and second periods t1 and t2, which may have been modified in F18 or F20.

Figure 13:
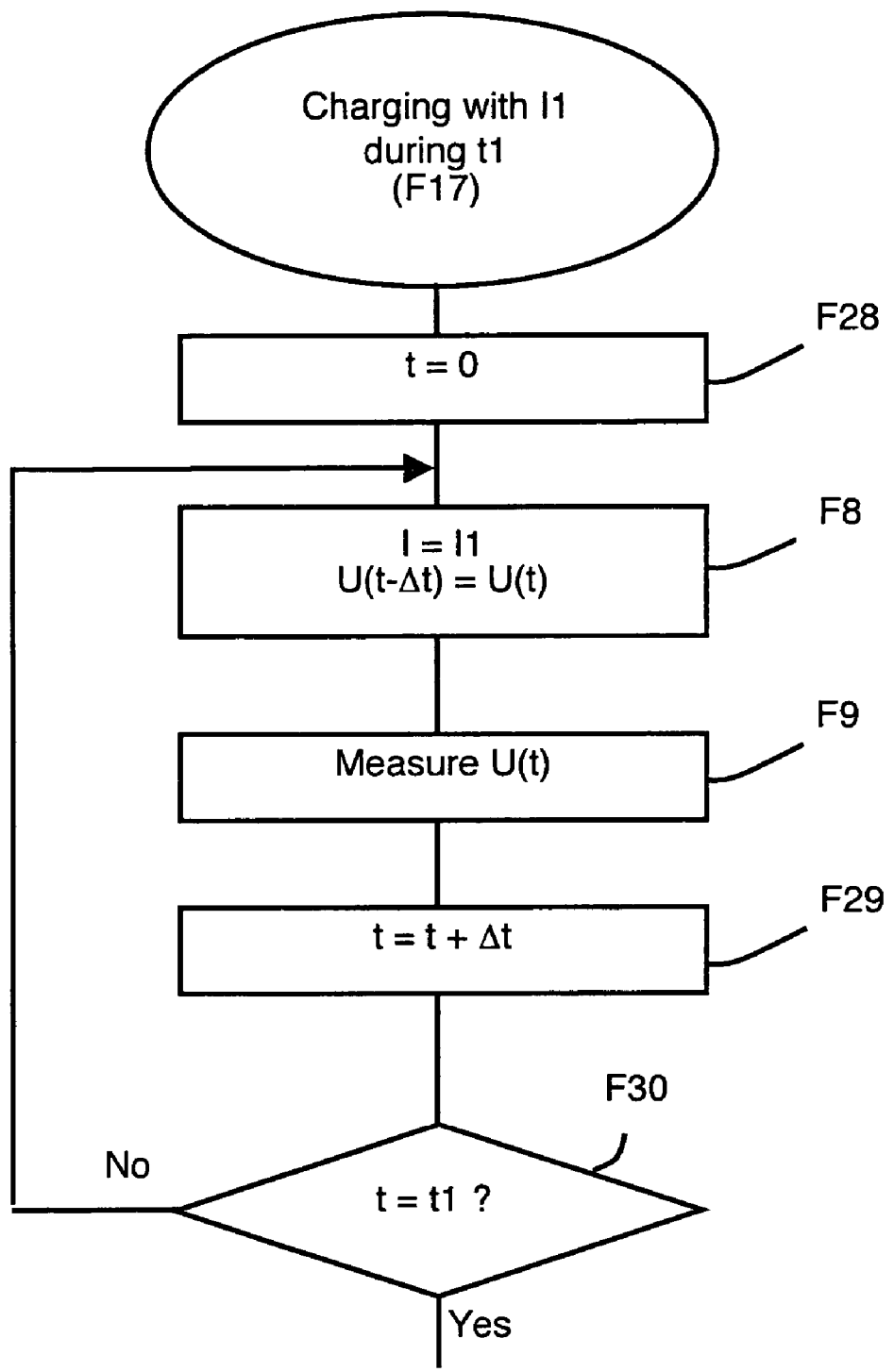
Figure 14:
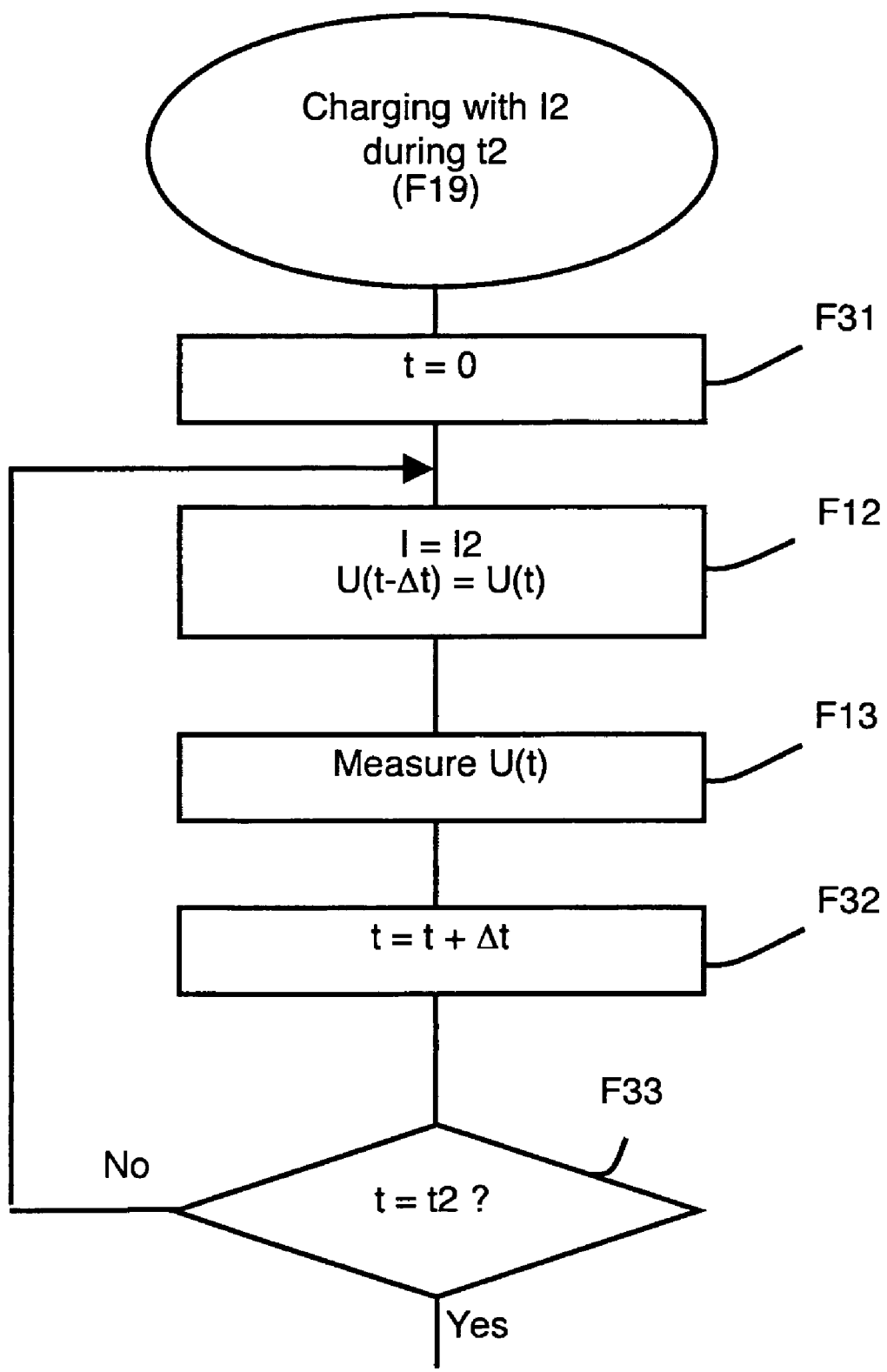

Embodiments of steps F17 and F19 are illustrated in greater detail respectively in FIGS. 13 and 14.

In FIG. 13, step F17 starts with a step F28 in which a quantity t, representative of time, is set to zero (t=0). Then it goes on to a step F8 (I=I1 and U(t−Δt)=U(t)), and then to a step F9 of measuring the voltage U(t), followed by a time incrementation step F29 (t=t+Δt). The regulator then checks, in a step F30, whether the time elapsed since the beginning of the step F17 is equal or not to the first period t1. If this is the case (Yes output of F30), step F17 is terminated. If not (No output of F30), the regulator loops back to step F8 and continues charging the battery with the pulse of amplitude I1 until the end of the first period t1.

In like manner, in FIG. 14, step F19 starts with a step F31 in which the quantity t, representative of time, is set to zero (t=0). Then it goes on to a step F12 (I=I2 and U(t−Δt)=U(t)), and then to a step F13 of measuring the voltage U(t), followed by a time incrementation step F32 (t=t+Δt). The regulator then checks, in a step F33, whether the time elapsed since the beginning of step F19 is equal or not to the second period t2. If this is the case (Yes output of F33), step F19 is terminated. If not (No output of F33), the regulator loops back to step F12 and continues charging the battery with the pulse of amplitude I2 until the end of the second period t2.

Calculation of the new parameters in step F18 is designed to servo-control the first current amplitude I1 and/or the duration of the first period t1 as a function of the first slope value P1 calculated at the end of the first period t1.

Thus, if the first slope value P1 is, in absolute value, higher than the upper limit of the first range, for example greater than 6 mV/s, this means that the first period t1 is too short, as in FIG. 4, and/or that the first amplitude I1 is too high. Calculation of the new parameters in step F18 then consists in increasing the first period t1 and/or reducing the first amplitude I1, depending on the field of application of the battery and its operating conditions. Likewise, if the first slope value P1 is, in absolute value, lower than the lower limit of the first range, for example less than 1 mV/s, this means that the first period t1 is too long, as in FIG. 3, and/or that the first amplitude I1 is too low. Calculation of the new parameters in step F18 then consists in reducing the first period t1 and/or increasing the first amplitude I1, depending on the field of application of the battery and its operating conditions. In the latter case, for a photovoltaic installation for example, the current delivered by the solar panels depends on the sunshine and it is therefore preferable to make an adjustment to the duration of the period t1 rather than the amplitude I1.

In like manner, calculation of the new parameters in step F20 enables servo-control of the second current amplitude I2 and/or the duration of the second period t2 as a function of the second slope value P2, calculated at the end of the second period t2.

In an alternative embodiment, the current parameters are modified, in steps F18 and/or F20, so as to keep the mean value of the charging current constant, Imean=(I1t1+I2t2)/(t1+t2), during a charging period, i.e. during a first period t1 and the following second period t2. The mean value Imean of the charging current is then initially determined, at the same time as the values I1, I2, t1 and t2, during the initialization step F16, according to the technical characteristics of the battery to be charged and the field of application for which this battery is intended.

In the case where the second amplitude I2 of the charging current is constantly kept at zero, calculation of the new parameters during step F20 can act at the same time on the second period t2 and on the first amplitude I1 so as to keep the mean value Imean constant. Thus, if the second slope value P2 is, in absolute value, higher than the upper limit of the second range, the second duration t2 is increased while the first amplitude I1 is reduced so as to keep Imean constant. In like manner, if the second slope value P2 is, in absolute value, lower than the lower limit of the second range, the second duration t2 is reduced while the first amplitude I1 is increased to keep Imean constant.

Figure 15:
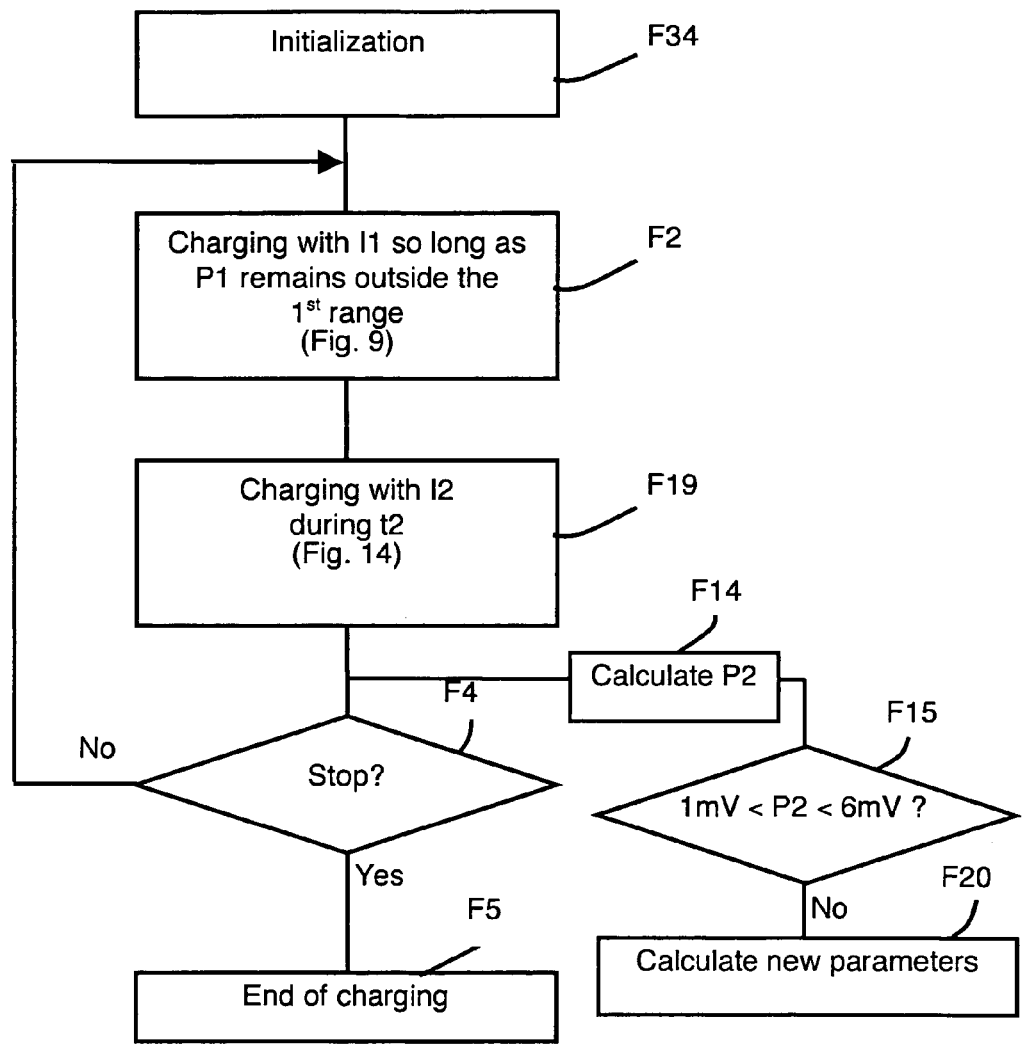
FIGS. 15 and 16 represent the flowcharts of two other embodiments of a method according to the invention.

A third embodiment, illustrated in FIG. 15 combines step F2 of the first embodiment (FIG. 7) during the first charging periods and steps F19, F14, F15 and F20 of the second embodiment (FIG. 11) during the second charging periods. Thus, in an initialization step F34, the values of I1, I2, t2, and if applicable Imean, are determined. Then, in step F2, the regulator charges the battery with a current of amplitude I1 so long as the first slope value P1 remains outside the first range. Then, in step F19, it charges the battery with a current of amplitude I2 during the second period t2, and then calculates P2 (step F14) and compares it with the second range (step F15). If P2 is outside the second range (No output of F15), the regulator modifies I2 and/or t2, while keeping the mean current value Imean constant if applicable. As in FIG. 11, steps F4 and F5 follow step F19 and the regulator loops back to step F2 if charging is not completed (No output of F4).

In this third embodiment, the duration of the first period (t1) is therefore servo-controlled as a function of the first slope value P1, calculated continuously during the first period t1. The latter is interrupted when the first slope value P1 enters the first range. On the other hand, the second slope value P2 is calculated at the end of the second period t2 and the second amplitude I2 and/or the duration of the second period t2 are servo-controlled as a function of this second slope value P2.

Figure 16:
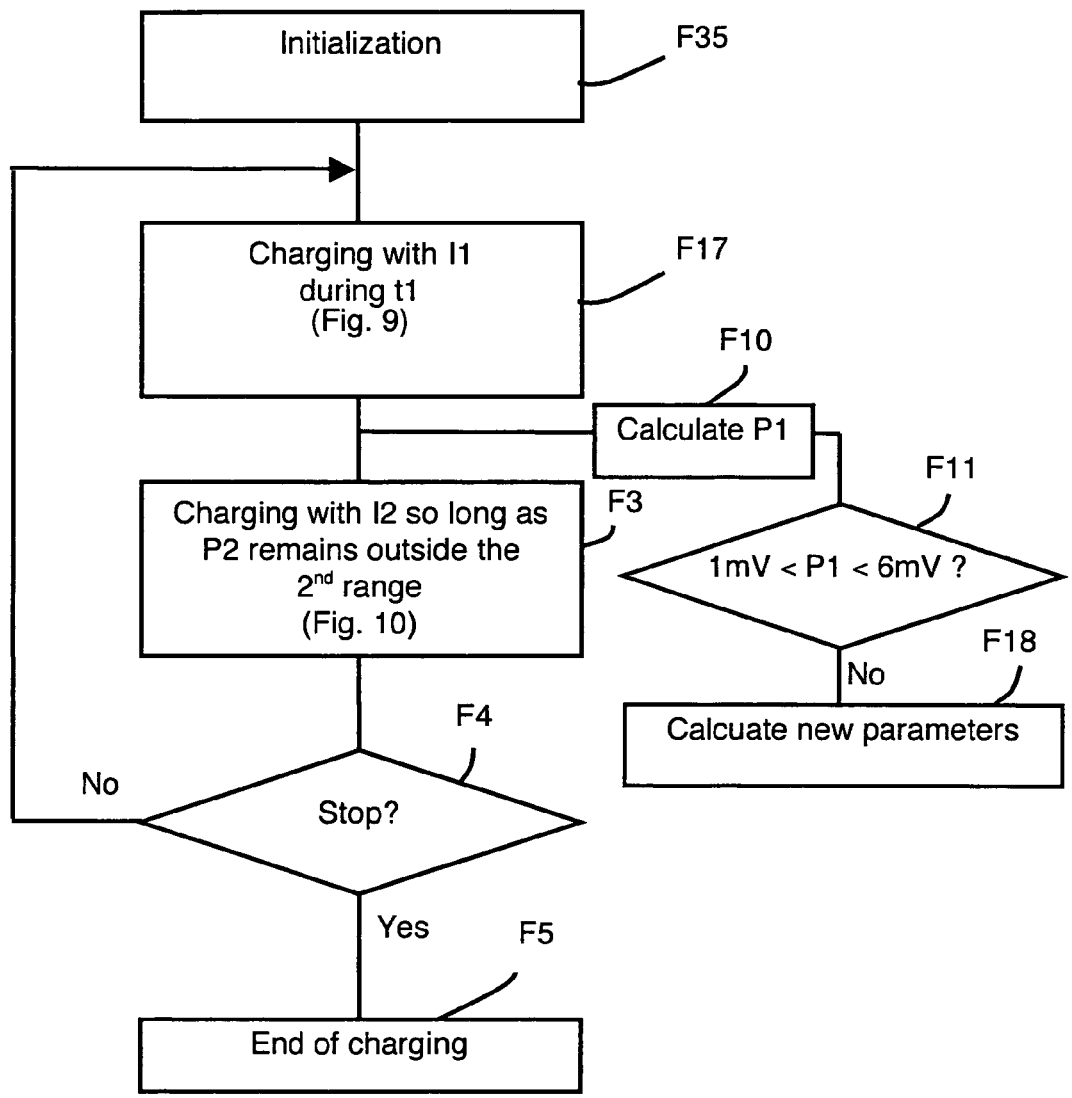

A fourth embodiment, illustrated in FIG. 16 combines steps F17, F10, F11 and F18 of the second embodiment (FIG. 11) during the first charging periods and step F3 of the first embodiment (FIG. 7) during the second charging periods. Thus, in an initialization step F35, the values of I1, t1, I2, and if applicable Imean, are determined. Then the regulator charges the battery, in step F17, with a current of amplitude I1 during the first period t1, before going on to step F3 in which the regulator charges the battery with a current of amplitude I2 so long as the second slope value P2 remains outside the second range. At the end of step F17, the regulator calculates the first slope value P1 (step F10) and compares it with the first range (step F11). Then, if P1 is outside the first range (No output of F11), the regulator modifies I1 and/or t1, while keeping the mean current value Imean constant if applicable. As in FIG. 7, steps F4 and F5 follow step F3 and the regulator loops back to step F17 if charging is not completed (No output of F4)

In this fourth embodiment, the first slope value P1 is calculated at the end of the first period t1 and the first amplitude I1 and/or the duration of the first period t1 are servo-controlled as a function of this first slope value P1. On the other hand, the duration of the second period t2 is servo-controlled as a function of the second slope value P2, calculated continuously during the second period t2. The latter is interrupted when the second slope value P2 enters the second range.

Figure 17:
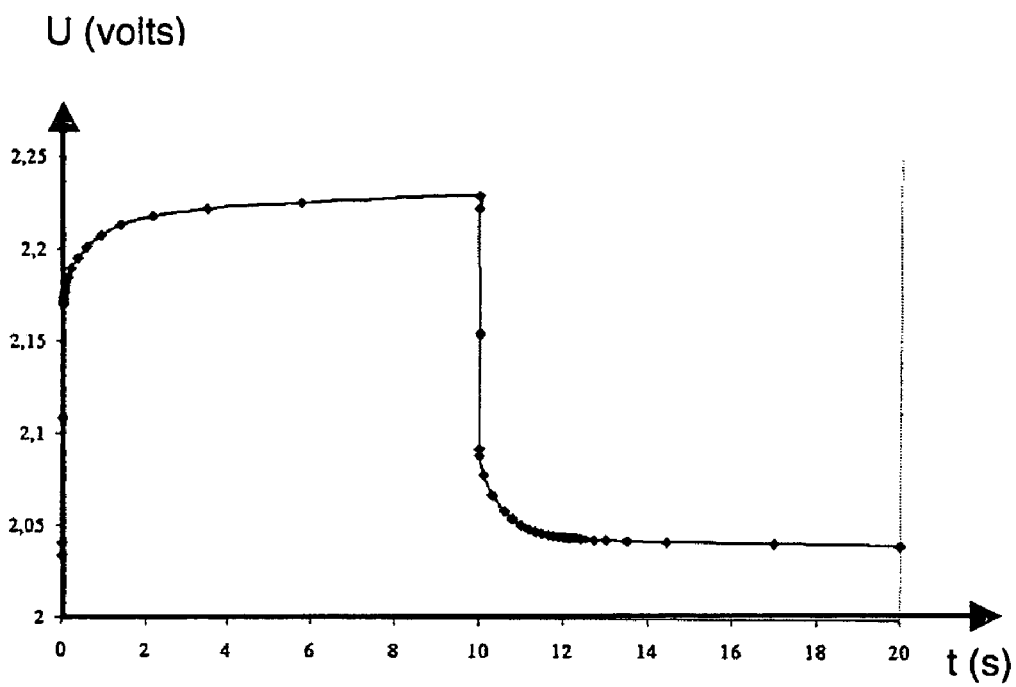
FIGS. 17 and 18 illustrate in greater detail the variations of the voltage measured when charging a battery, charged with pulses of constant amplitude, respectively before and after adjustment of the time parameters of the current pulses according to the invention.
Figure 18:
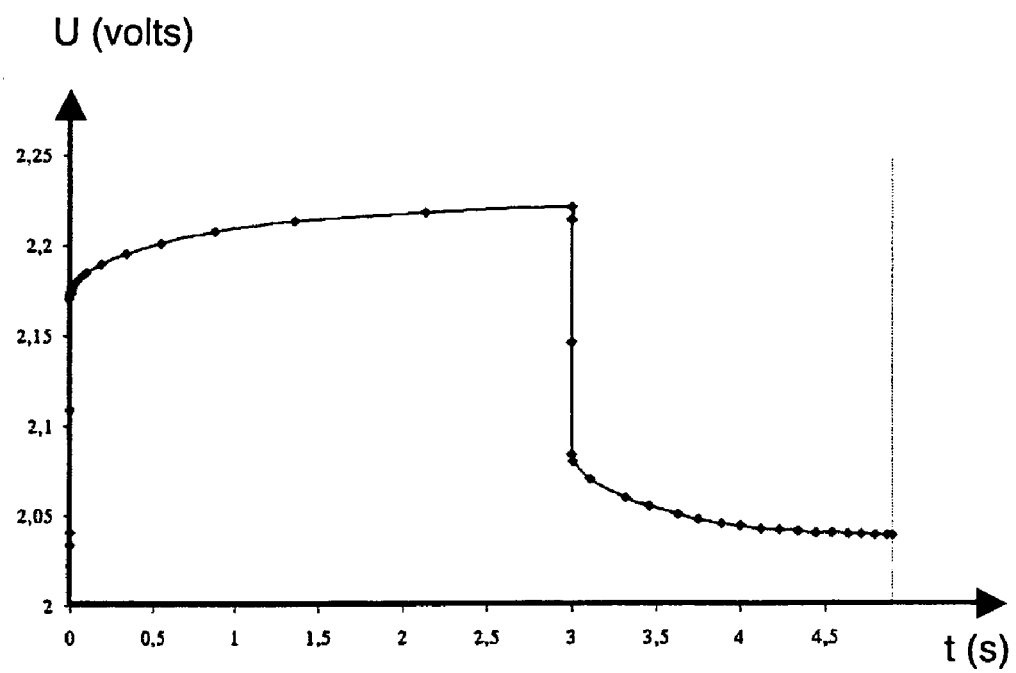

FIGS. 17 and 18 illustrate in greater detail the variations of the voltage measured when charging a lead-acid battery with an initial capacity of 25 Ah. The battery is charged with a pulsed current taking a first amplitude I1 of 2.5 A during a first period t1 of 10 s and a zero second amplitude I2 during a second period t2 of 10 s.

FIG. 17 illustrates the voltage variations without adjustment of the time parameters of the current pulses according to the invention, for a charged state of 90%. The slope values P1 and P2 at the end of the first and second periods are respectively equal to 0.9 mV/s and 0.2 mV/s, in absolute value. These two values are, in absolute value, lower than the lower limit of 1 mV/s of the corresponding first and second range. The durations of the first and second periods are therefore unsuitable.

FIG. 18 illustrates the voltage variations obtained after adjustment of the time parameters t1 and t2 according to the invention. Servo-control of t1 and t2 as a function of the slope values P1 and P2 leads to a decrease of t1 and t2 to bring P1 and P2 into their respective ranges at the end of the first and second periods. In FIG. 18, the optimum parameters obtained are 3 s for t1 and 1.9 s for t2. The first and second slope values P1 and P2, respectively at the end of the first and second periods, are then, in absolute value, respectively equal to 5 mV/s and 3 mV/s.

Figure 19:
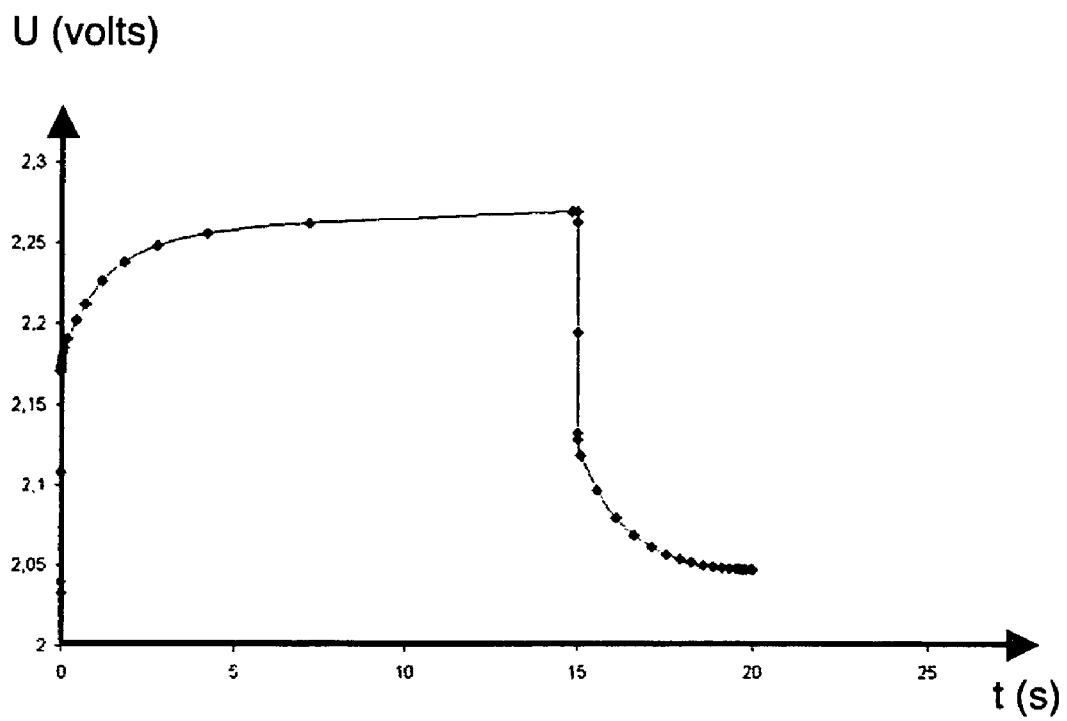
FIGS. 19 and 20 illustrate in greater detail the variations of the voltage measured when charging a battery, charged with a pulsed current of constant mean amplitude, respectively before and after adjustment of the current pulse parameters according to the invention.
Figure 20:
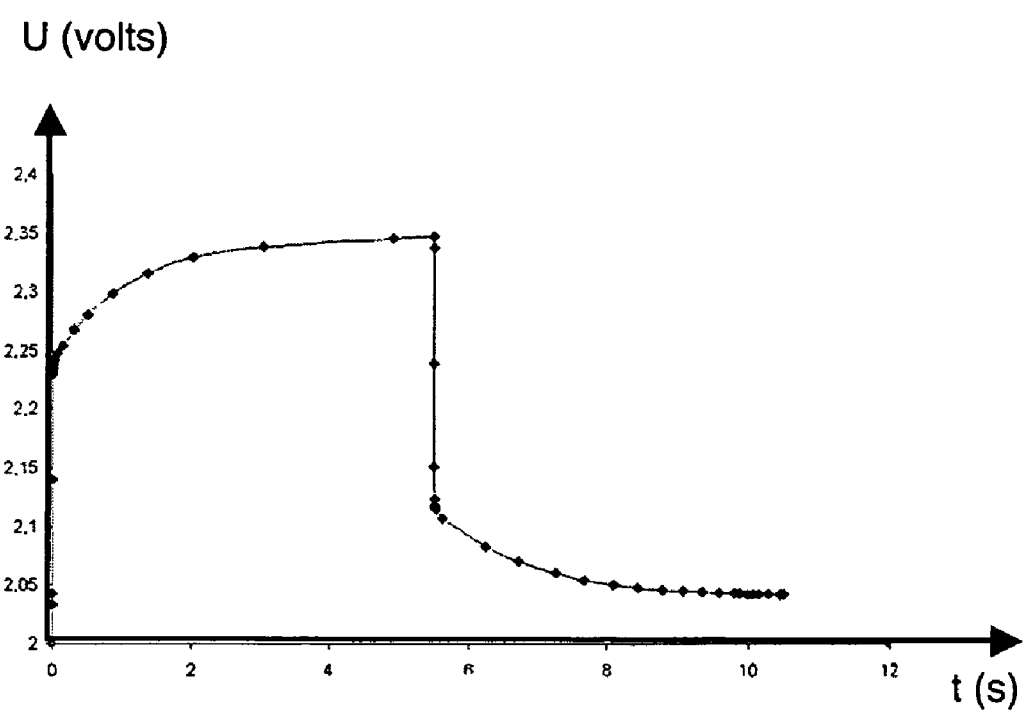

In the example illustrated in FIGS. 19 and 20, a lead-acid battery with an initial capacity of 25 Ah is charged with a constant mean current Imean. Initially the first period t1 is 15 s, for a charging current having a first amplitude I1 of 2.5 A, whereas the second period t2 is set to 5 s with a charging current having a zero second amplitude I2.

In FIG. 19, without adjustment of the current parameters, for a charged state of 95%, the absolute values of the slope values P1 and P2 at the end of the first and second periods are respectively equal to 0.6 mV/s and 1.3 mV/s. The first slope value P1 is therefore lower than the lower limit of 1 mV/s of the first range, whereas the absolute value of the second slope value P2 at the end of the second period is within the limits of the second range. The charging current parameters are therefore unsuitable.

FIG. 20 illustrates the voltage variations obtained after adjustment of the current parameters according to the invention. Servo-control of I1 and t1 as a function of the first slope value P1 leads to a decrease of t1 and an increase of I1 to bring P1 into the first range at the end of the first period. In FIG. 20, the optimum parameters obtained are 5.5 s for t1 and 3.58 A for I1. The first slope value P1 at the end of the first period is then equal to 2.4 mV/s, whereas the absolute value of the second slope value P2 at the end of the second period remains unchanged at 1.3 mV/s.

The charging method according to the invention therefore enables the set of parameters of the pulsed current to be continuously adjusted when charging or recharging any type of battery, for example for different types of lead-acid batteries, and for any type of application, in particular for batteries used in electric vehicles, in photovoltaic applications, etc.

The method applies equally well to recharging the battery in the course of use thereof and to the first charge of the battery when the latter is manufactured. The first charge of a lead battery when the latter is manufactured in fact enables lead dioxide $PbO_2$ to be formed at the positive plates of the battery and lead Pb to be formed at the negative plates of the battery. Lead and lead dioxide are however the two chemical species produced when charging of the battery is performed, whereas lead sulfate $PbSO_4$ appears when the battery discharges. At present, conventional manufacturing of a battery only leads to partial use, less than 50%, of the active material. Yet it has been shown, in an article by Diniz et al., in "Journal of Power Sources", vol. 109, p. 184-188, published in 2002, that the use of pulsed current when the plates were formed could, in certain cases, lead to a large increase of the useful active material, up to 74%, and could consequently increase the Faraday efficiency of the battery. Application of the method according to the invention to the first charge of a battery when the latter is manufactured enables the charging parameters to be optimized.

The invention is not limited to the particular embodiments described above. In particular, servo-control of one of the current parameters as a function of the slope of the voltage U versus time can be limited to one of the first and second periods only. Although servo-control of both the slope values P1 and P2 enables a better optimization, servo-control of one slope value only, P1 or P2, can be envisaged and already enables charging of the battery to be improved in comparison with known charging methods.

As represented in FIGS. 2 to 6 and 17 to 20, the slope value P2 is negative, whereas the slope value P1 is positive. Preferential use of the absolute value when calculating the slope values means that the signs do not have to be taken into account when the slope values are compared with the ranges, which can themselves then be defined in absolute value only.

The invention claimed is:

1. Method for charging a battery by rectangular current pulses alternately taking a first amplitude during a first period and a second amplitude, different from the first one, during a second period, method comprising determination of a first slope value representative of the variation of the voltage the battery terminals versus time, from successive measurements, of said voltage during each first period, wherein the first amplitude and the duration of the first period being previously determined, the method comprises servo-control of at least one of the current parameters during the subsequent first periods as a function of said first slope value calculated and compared with a first predetermined range at the end of each first period, the first current amplitude and/or the duration of the first period being modified if the first slope value goes outside the first range.

2. Method according to claim 1, wherein the first range is, in absolute value, comprised between 1 mV/s and 6mV/s.

3. Method according to claim 1, comprising
at least two successive measurements of the voltage at the battery terminals during each second period,
calculation, from the voltage measurements during the second period, at least at the end of each second period, of a second slope value representative of the variation of the voltage versus time,
comparison of the second slope value with a second predetermined range,
servo-control of at least one of the parameters of the current during the second period as a function of the second slope value.

4. Method according to claim 3, wherein the second range is, in absolute value, comprised between 1mV/s and 6mV/s.

5. Method according to claim 3, wherein, during each second period, the successive voltage measurements are made at predetermined time intervals, much shorter than the second period, the second slope value being calculated and compared with the second range after each voltage measurement, the second period being interrupted when the second slope value enters the second range.

6. Method according to claim 3, wherein the second slope value is calculated and compared with the second range at the end of the second period, the second current amplitude and/or the duration of the second period being modified if the second slope value goes outside the second range.

7. Method according to claim 6, wherein, the second current amplitude being zero, the duration of the second period and the first current amplitude are modified if the second slope value goes outside the second range.

8. Method according to claim 1, wherein the current parameters are modified so as to keep the mean value of the current amplitude constant during a charging period constituted by a first period and the following second period.

* * * * *